United States Patent [19]

Anjan et al.

[11] Patent Number: 5,042,905
[45] Date of Patent: Aug. 27, 1991

[54] ELECTRICALLY PASSIVE FIBER OPTIC POSITION SENSOR

[75] Inventors: Yellapu Anjan, Scottsdale; Tamim F. El-Wailly, Peoria; Lee K. Strandjord, Scottsdale, all of Ariz.

[73] Assignee: Honeywell Inc., Minneapolis, Minn.

[21] Appl. No.: 539,101

[22] Filed: Jun. 15, 1990

[51] Int. Cl.⁵ .............................................. G02B 6/02
[52] U.S. Cl. .................................. 385/13; 250/227.16; 385/1; 385/15
[58] Field of Search ............... 350/96.15, 96.18, 96.29, 350/96.30; 250/227.11, 227.14, 227.16, 225; 356/350

[56] References Cited

U.S. PATENT DOCUMENTS

| 4,376,248 | 3/1983 | Giallorenzi et al. | 250/227.19 |
| 4,588,296 | 5/1986 | Cahill et al. | 356/350 |
| 4,733,938 | 3/1988 | Lefevre et al. | 350/96.29 |
| 4,843,232 | 6/1989 | Emo et al. | 250/225 |

OTHER PUBLICATIONS

"Fiber Optic Sensor for Aircraft", in *SPIE vol. 985 Fiber Optic and Laser Sensors VI* (1988).

*Primary Examiner*—Frank Gonzalez
*Attorney, Agent, or Firm*—John G. Shudy, Jr.

[57] ABSTRACT

An electrically passive fiber optic position sensor having a course measurement indicator and a fine measurement indicator combined to determine the overall position, whether linear or angular, of an object measured. The coarse measurement sensor depends on bending loss of optic fiber in one embodiment and on the Faraday effect in another embodiment. The fine measurement indicator depends on the Faraday effect in both embodiments. The invention avoids the problems of contaminated optics as the light need not leave the optic fiber.

6 Claims, 8 Drawing Sheets

ELECTRICALLY PASSIVE FIBER OPTIC POSITION SENSOR

FIELD OF THE INVENTION

The present invention pertains to fiber optic sensors and particularly to passive position sensors.

BACKGROUND OF THE INVENTION

There is a need for electrically passive fiber optic position sensors in aircraft systems due to the inherent advantages of fiber optics in view of the drawbacks of other kinds of sensors, particularly the active electrical. Passive sensors are compatible with fiber optic data links which may be a part of fly-by-light type aircraft. Linear variable differential transformers (LVDTs), the most commonly used electrical position sensors, have been proven to be reliable and are readily available with measurable position scales ranging from 0.01 to 10 inches. However, since they are electrically operated, LVDTs can easily malfunction when there is electromagnetic interference from such things as lightning, radio transmissions or microwaves. Another approach in the related art is the optically powering of LVDTs. The electrical power needed for the LVDTs is obtained by converting the optical power that has been transmitted through the fibers. The needed optical-to-electrical and back-to-optical conversions make such a system very inefficient.

Most fiber optic position sensors operate on the intensity modulation principle. The position of a (e.g., twelve bit) gray-coded encoder bar is read with read heads which provide analog or digital light pulses that are multiplexed either by time division or by wavelength division. A common problem in intensity-modulated fiber optic position sensors is contamination of optics which degrades performance and results in error in the decision-making electronics. An avoidance of the problem was attempted by utilizing an optically powered electrical position sensor such as an LVDT. Another problem is the potentially troublesome complex time division or wavelength division multiplexing of the intensity modulated sensor.

SUMMARY OF THE INVENTION

The present invention is a sensor that eliminates the problems of contaminated optics and complex multiplexing of the related art methods. The sensor combines fiber optic and magnetic technology. The invention is based on a concept of coarse and fine position measurements. The measurements may be of linear or angular positions. These measurements are obtained from signals corresponding to intensity modulations of light propagating through the optic fiber. The fine position measurement is achieved by two fiber optic reading heads. When one head is at a poor position resolution, the other head is positioned so as to achieve better resolution.

One of the advantages of the invention is that the light does not leave the fiber, thereby eliminating the optics contamination problem. Thus, performance and reliability are attained. The light is reflected back from the end of the fiber. No gray coded decoder is required, thereby keeping the complexity of needed electronics minimal. The invented device includes fault detector of the fiber link. Fault detection of the fiber link is part of the position signal. The device utilizes simple time division multiplexing or wavelength division multiplexing to further reduce device complexity and improve reliability and efficiency. The present invention is less expensive than other related art fiber optic position sensors.

The invention has coarse and fine intensity modulations which correspond to coarse and fine measurements of position. The full scale output of the coarse measurement is divided into several divisions, each of which is further magnified into several divisions of which, in turn, each is magnified with a fine measurement. This is realized by obtaining the outputs from two read heads whose response would be similar to sine and cosine functions. When the measurement from one head corresponds to a maximum or a minimum where the resolution is poor, the response from the other head is used.

DESCRIPTION OF THE PREFERRED EMBODIMENTS

Figure 1A:
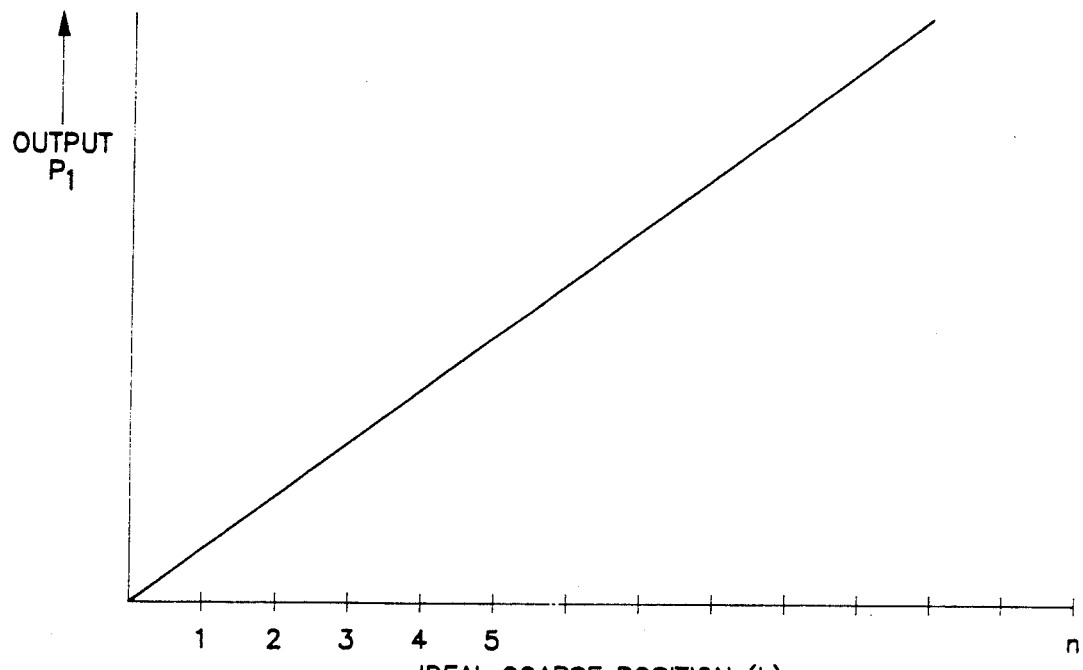
FIGS. 1a and 1b show ideal relationships of response outputs versus coarse and fine positions, respectively.
Figure 1B:
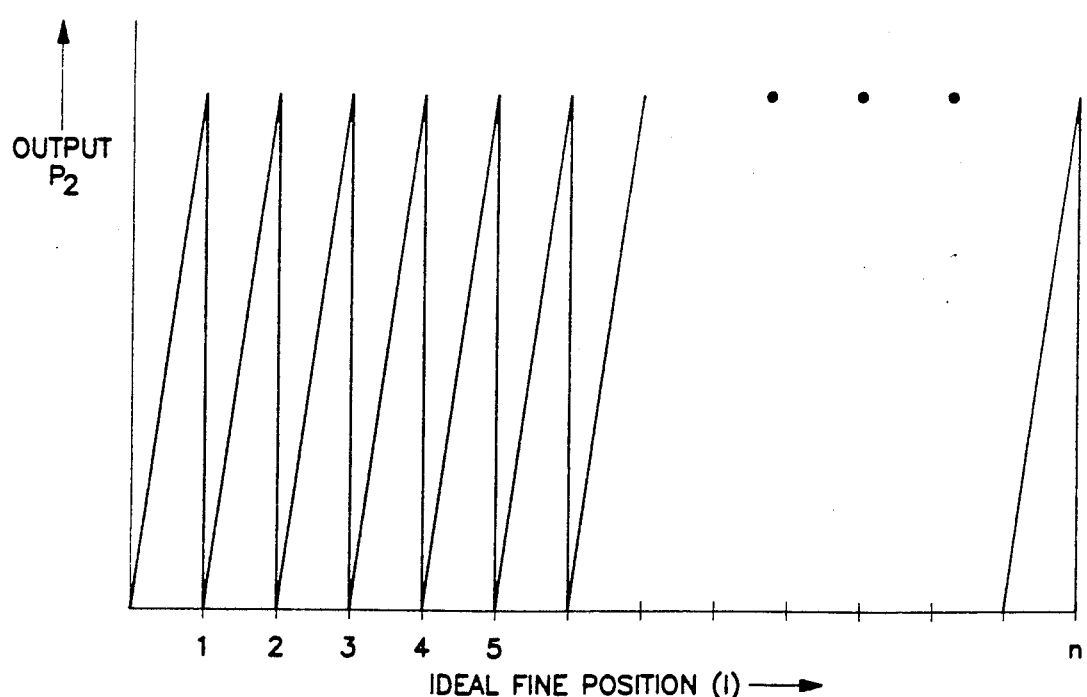

The present invention has two parts—coarse and fine intensity modulations. The ideal responsiveness or optical outputs corresponding to these two modulations are shown in FIGS. 1a and 1b, respectively. Output $P_1$ is linear with position in FIG. 1a and is divided into divisions. In FIG. 1a, a full scale output of the coarse measurement is divided into "n" (e.g., 1, 2, . . . ) calibrated parts. Each division of $P_1$ is amplified by fine sensing output $P_2$. In other words, each coarse division measurement is magnified, as shown in FIG. 1b. If the position to be measured corresponds to an output between 1 and 2 of the coarse sensing, the coarse reading is 1. The remaining portion of the reading corresponding to the position is obtained from the fine power output $P_2$ for between 1 and 2. Both the coarse and fine measurements must be repeatable. The calibrated positions are tabulated with corresponding digital counts of the coarse and fine output voltages. The calibrated positions are stored in an EPROM. With the use of a lookup table of the EPROM, a position of a shaft or bar can be displayed.

Figure 2A:
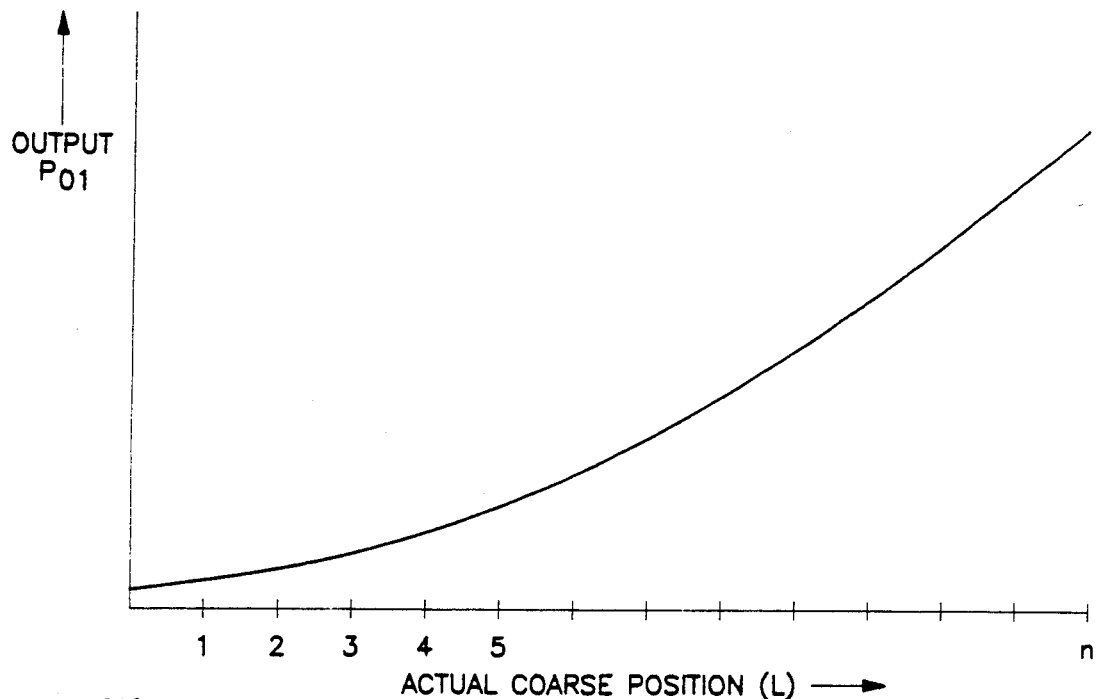
FIGS. 2a and 2b show the non-ideal relationships of actual response outputs versus coarse and fine positions.
Figure 2B:
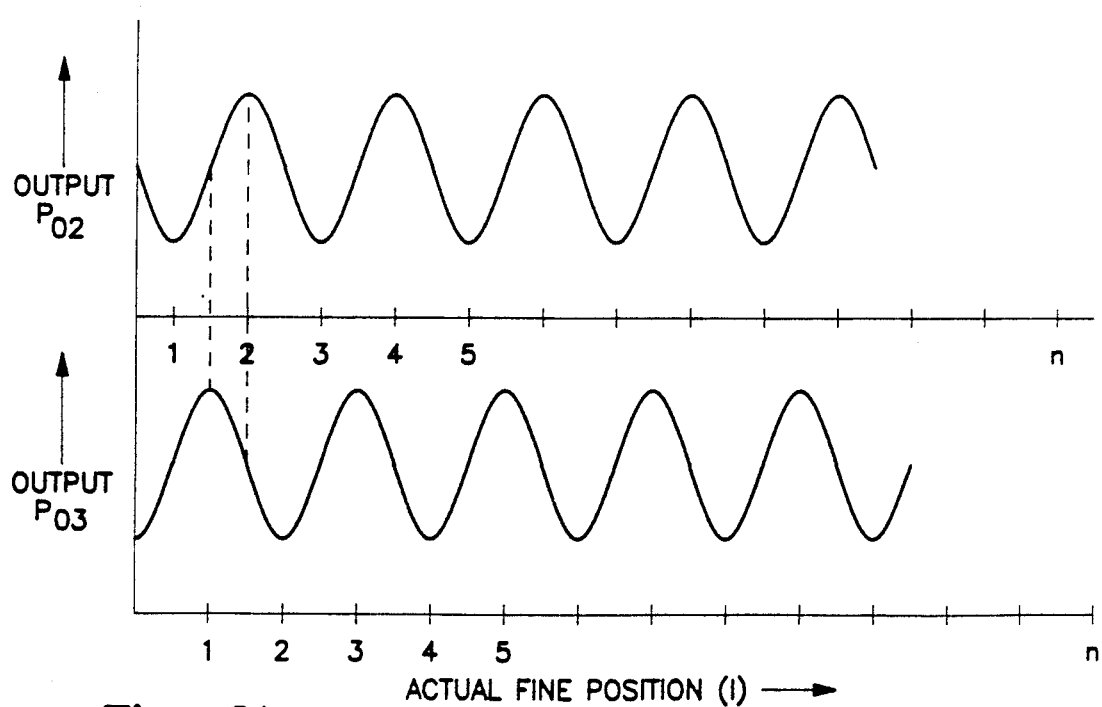

In practice, the sensor outputs need not be ideal. FIGS. 2a and 2b show non-ideal coarse and fine intensity modulations, respectively, relative to position. The coarse position need not be linear as long as it is repeatable and one coarse division can be resolved from the neighboring divisions. The full scale output $P_{o1}$ needs to be large, i.e., 15 to 20 dB, and the change is divided into several divisions which are distinguishable. The fine position measurement is realized by obtaining the response of two functions (i.e., two read heads) orthogonal to each other. Outputs $P_{o2}$ and $P_{o3}$ are similar to the "sine" and "cosine" functions, as shown in FIG. 2b. At a function's maximum and minimum, where resolution is poor, the response of the other function is used as it has a larger slopes corresponding to those points. That is, if the output from one head corresponds to a maximum or a minimum, where the resolution is poor, the output from the other read head having a larger slope is used. The peak-to-peak power of the sine wave needs to have an optical power difference of 10 to 15 dB.

Intensity modulation may be effected through the variation of optical parameters such as bending loss, polarization angle or state, Faraday rotation and reflection.

Figure 3:
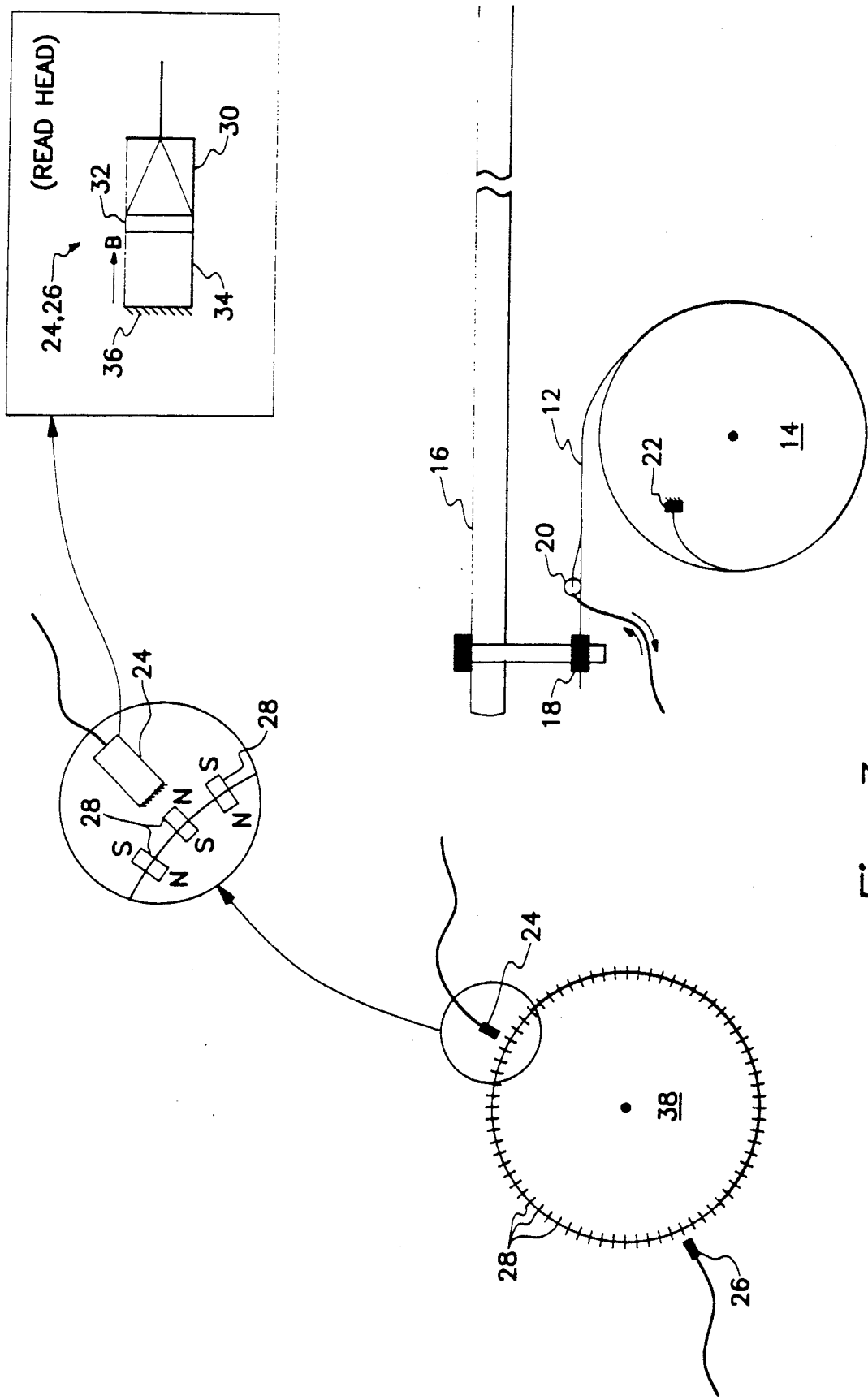
FIG. 3 reveals an embodiment of the invention utilizing fiber bending loss for coarse position determination and the Faraday effect for fine position determination.

Several methods for achieving coarse and fine intensity modulation are disclosed here. In these methods, light does not leave the fiber. In the first approach, coarse intensity modulation is obtained through the bending loss in a fiber. The light which is guided through the fiber core is converted into the cladding modes when the fiber is bent over a certain radius. FIG. 3 illustrates this type of intensity modulation. Fiber cable 12, which is wound around spool 14, is attached to shaft 16 at connector 18. The shaft 16 position is that which is to be measured and determined. Shaft 16 is moveable in position. Its position determines the amount of fiber cable 12 wound around spool 14. One end of fiber 12 is connected to coupler 20. The other end of fiber 12 has mirror 22 attached or coated on fiber 12 which reflects light back into fiber 12. Power output $P_{o1}$ from fiber 12 which is wound over spool 14 of radius R, is provided by the equation $$P_{o1} = P_{in1} EXP(-aL) (1 - EXP(-R/(n_t R_c))), \quad (1)$$

where "a" is the fiber attenuation or loss per unit length, $R_c$ is the critical radius which depends on the fiber numerical aperture and the core and cladding diameters, $n_t$ is the number of turns of fiber 12 wound over spool 14, $P_{in1}$ is the input power to fiber 12, and $L = 2\pi R n_t$. Upon an appropriate choice of initial conditions such as R and the type of fiber, output power from fiber 12 is dependent on the length of fiber 12 unwound from spool 14 to obtain an output similar to that shown in FIG. 2a. An alternative to a multimode fiber which has greater sensitivity to the bending radius is polarizing fiber. The loss in power occurs because of a large difference in propagation constants of the two polarizations.

Figure 4:
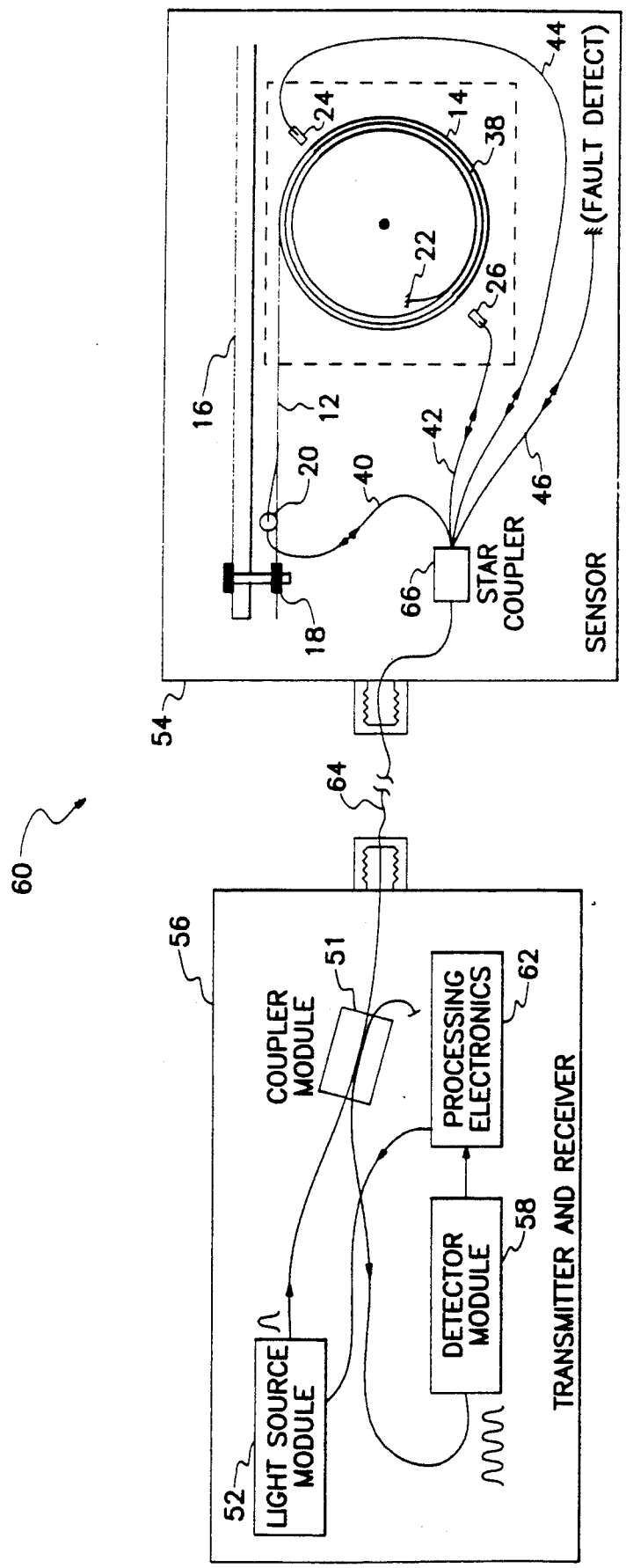
FIG. 4 shows a system configuration for position measurement based on fiber bending loss and Faraday effect.
Figure 6:
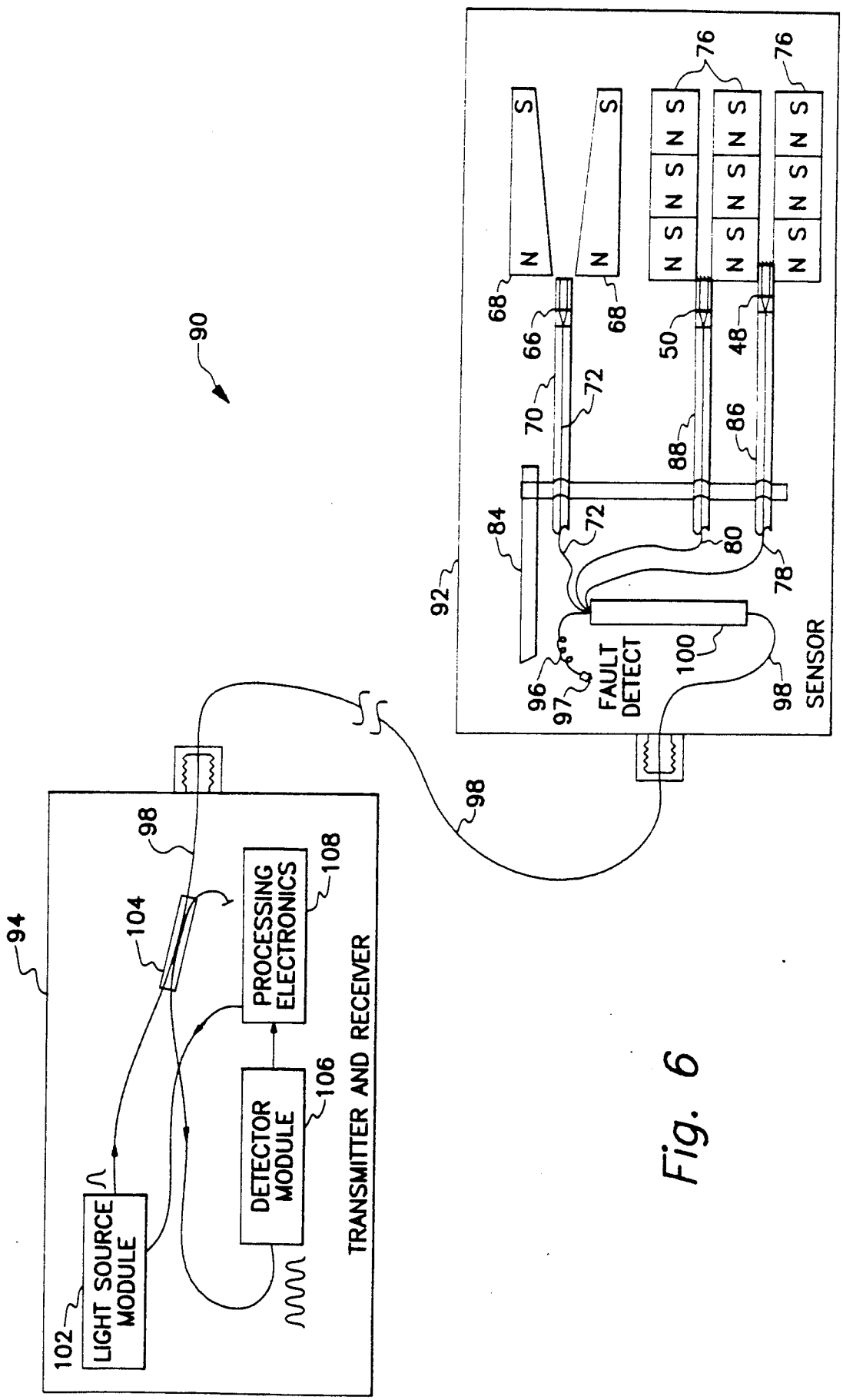
FIG. 6 shows a system configuration for coarse and fine position measurements based exclusively on the Faraday effect.

FIG. 3 also reveals fine position intensity modulation utilizing the Faraday effect, wherein the plane of polarization of light propagating through a medium can be rotated by applying an external magnetic field. The Faraday effect is a magneto-optic effect. The amount of rotation depends on the type of utilized medium, magnetic flux density and the distance of propagation of light in the medium. Two read heads 24 and 26 are used for position sensing. The intensity of light is modulated such that the responsiveness from a detector in detector modules 58 and 106 (as shown in FIGS. 4 and 6, respectively) is sinusoidal. The positions of fiber optic read heads 24 and 26, respectively, are situated such that their intensity modulations have a phase difference of 90 degrees. In other terms, heads 24 and 26 are positioned so that a 90 degree phase shift occurs between the outputs of heads 24 and 26. Each fine position reading head, 24 and 26, has a collimating "Selfoc" lens 30, a plane polarizer 32, and a Faraday rotator 34 having a back reflecting surface 36, as shown in FIG. 3. Plane polarized light which is obtained as the light passes through Selfoc lens 30 and polarizer 32, is rotated by Faraday rotator 34 by an angle theta wherein $$\text{theta} = VBL. \quad (2)$$

V is the Verdet constant of Faraday rotator 34, B is the magnetic flux density parallel to the direction of propagation of light and L is the length of Faraday rotator 34. Sinusoidal modulation needed for fine measurements is obtained by varying B. B is varied by placing alternating polarity bar magnets 28 on a disk 38 which is attached to the same shaft as fiber winding spool 14 used for coarse position measurement. Disk 38 is concentric to spool 14 and rotates with spool 14. Magnetic flux B is radially outward when read head 24 or 26 directly faces or is near the north pole of magnet 28. Magnetic flux B is radially inward when read head 24 or 26 directly faces or is near the south pole of magnet 28. When read head 24 or 26 is in a position between north and south poles 28, the B field is approximately 90 degrees relative to the direction of light propagation in read head 28 and thus causes no Faraday rotation. The reflected light from mirror 36 at the back of a crystal (i.e., Faraday rotator 34) such as yttrium-iron-garnet or its compound is rotated by the same angle theta on its return trip, which means that the magnetically induced rotation is non-reciprocal. The electric field vector representing the plane of polarization is rotated by 2 theta after being reflected from the back of the crystal. The intensity or output power $P_{o2}$ coming from the first reading head 24 is $$P_{o2} = P_{in2}(1 - \text{loss})\text{Sin}^2(2\text{theta}). \quad (3)$$

Similarly, the second fiber reading head 26 located at a position corresponding to a position of 90 degrees out of phase with respect to the first read head 24, produces an output given by $$P_{o3} = P_{in3}(1 - \text{loss})\text{Cos}^2(2\text{theta}). \quad (4)$$

In the two above equations 3 and 4, $P_{in2}$ and $P_{in3}$ are the input powers. Loss is the total power loss in read heads 24 and 26.

FIG. 4 shows a system setup 60 for the first approach 54 of position measurement utilizing intensity modulation through bending loss in fiber 12 and the Faraday effect. Light source 52, detector module 58 and processing electronics 62 of block 56 are connected to measurement and sensor device 54 via coupler 51 and fiber link 64.

In addition to fibers 40, 42 and 44 of device 54 from coupler 66, another fiber 46 is incorporated for the purpose of normalization of signals and also for fault detection. Fiber 40 is connected to fiber 12 via coupler 20. Fiber 42 is connected to head 26 and fiber 44 is connected to head 24. Fibers 40, 42, 44 and 46 are coupled to fiber link 64 through star coupler 66.

Figure 5:
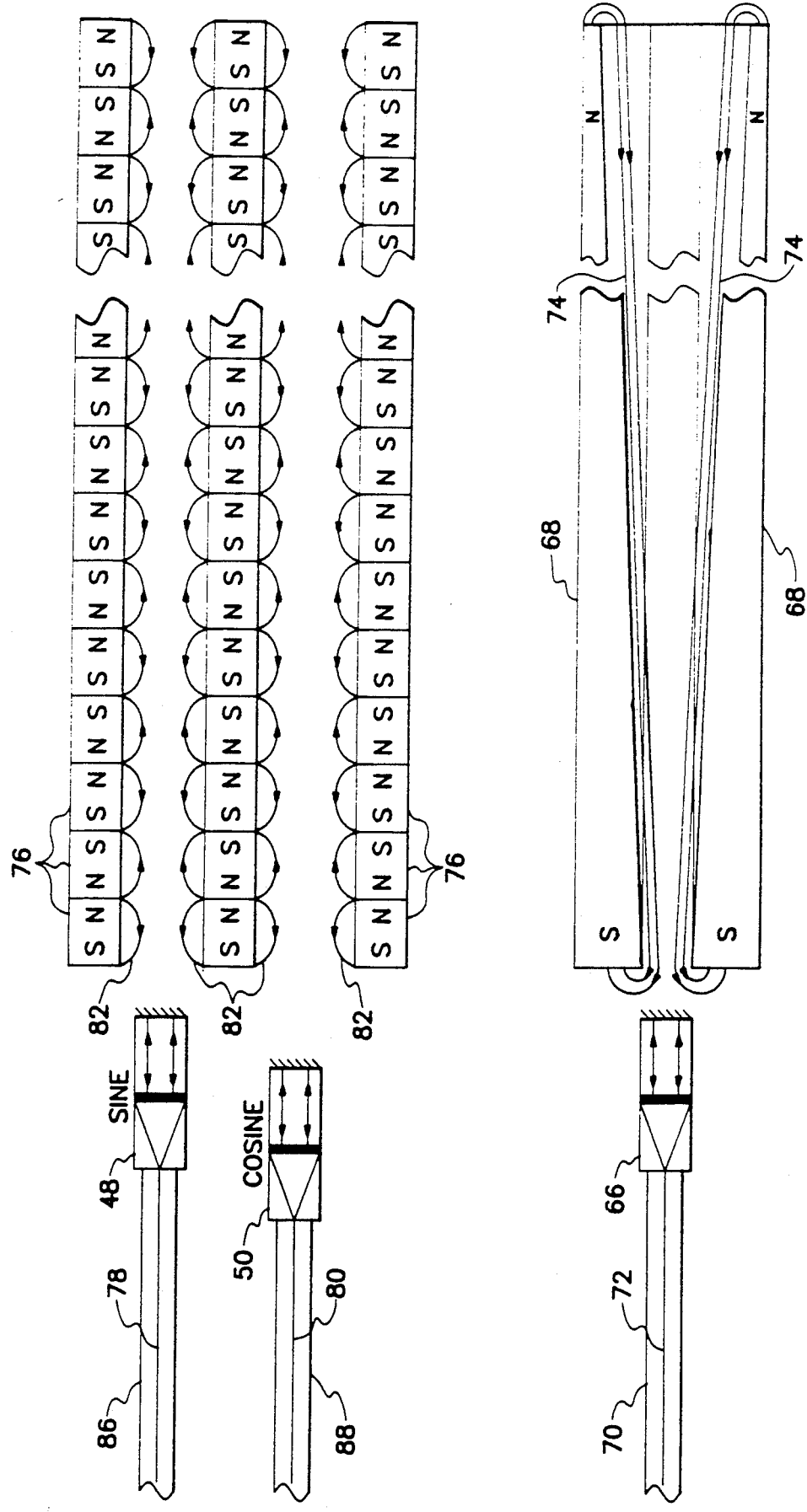
FIG. 5 reveals another embodiment of the invention utilizing magnetic effects of permanent magnets for coarse and fine position determinations.

In an alternative approach, coarse and fine position measurements are accomplished by varying the magnetic flux density B, as illustrated in FIGS. 5 and 6.

Read heads 48, 50 and 66 are the same as heads 24 and 26 described for measurements in the first above-described embodiment in FIGS. 3 and 4. The coarse intensity modulation is achieved by using a permanent magnet 68 whose pole separation increases linearly with position as shown in FIG. 5. One way of increasing the pole separation is by stacking a number of horse shoe magnets having increasing pole separation. As read head 66, which is connected to fiber 72 and attached to a shaft 70 whose position is to be determined, passes such a magnetic field 74, less Faraday rotation takes place for an increase of position. $P_{01}$ increases with increasing position as shown in FIG. 2a. For sinusoidal intensity modulation needed for fine position sensing is achieved by using an alternating polarity stack of permanent magnets 76 as shown in FIG. 5. The fine position intensity modulation also utilizes the Faraday effect. Read heads or detectors 48 and 50, connected to fibers 78 and 80, respectively, are used in a fashion that the intensity of light is modulated so that the responses from heads 48 and 50 are sinusoidal as they are affected by magnetic lines 82. The positions of fiber optic read heads 48 and 50 are situated such that their intensity modulations have a phase difference of 90 degrees. Relative to each other, the signal relationship of heads 48 and 50 is indicated by head 48 having a sine function output and head 50 simultaneously having a cosine function output. As shown in FIG. 6, heads 48, 50 and 66 are attached to shafts 86, 88 and 70, respectively, which in turn are attached to shaft 84 whose position is to be determined and measured.

FIG. 6 shows system configuration 90 for the position sensors as illustrated in FIG. 5. Electrically passive fiber optic sensor 92 is linked to the fiber optic transmitter and receiver box 94. Sensor box 92 consists of coarse and fine position sensing read heads 66, 50 and 48 which are anchored via shafts 70, 88 and 86, respectively, to shaft 84 whose position is to be determined. The four fibers, three (72, 80 and 78) from the read heads (66, 50 and 48, respectively) and one (96) from fault detect 97, are linked to a single fiber 98 through a 1×4 star coupler 100.

An optical pulse generated in light source module 102 is linked to fiber link 98 through a 2×2 coupler 104. At sensor end 92, the light pulse is divided into four parts by star coupler 100. To start with, the position of shaft 84 is set at the zero point or reference point. Then coarse position head 66 is adjusted such that the Faraday rotation angle is approximately equal to 45 degrees. This is done by looking for the minimum in the return signal pulse. At the full range of shaft 84, the Faraday rotation angle needs to be very little or almost negligible such that the back reflected output is at its maximum. Fine position read heads 48 and 50 are adjusted so that when one output $P_{02}$ is maximum, the other read head must have an output at mid point of the difference between the maximum and the minimum. The four returning pulses are either time division multiplexed or wavelength division multiplexed. FIG. 6 reflects the system for time division multiplexing.

The returning optical pulses are detected and amplified at detector module 106. These analog pulses are converted to digital counts and are normalized with respect to the signal obtained from fault detect fiber 96 in sensor 96. The digital counts are then tabulated and calibrated by processing electronics 108 as a function of the position of shaft 84. The calibrated counts versus position are stored in the memory of electronics 108 as a stored look-up table. The look-up table is used to find the exact position of the shaft.

Figure 7:
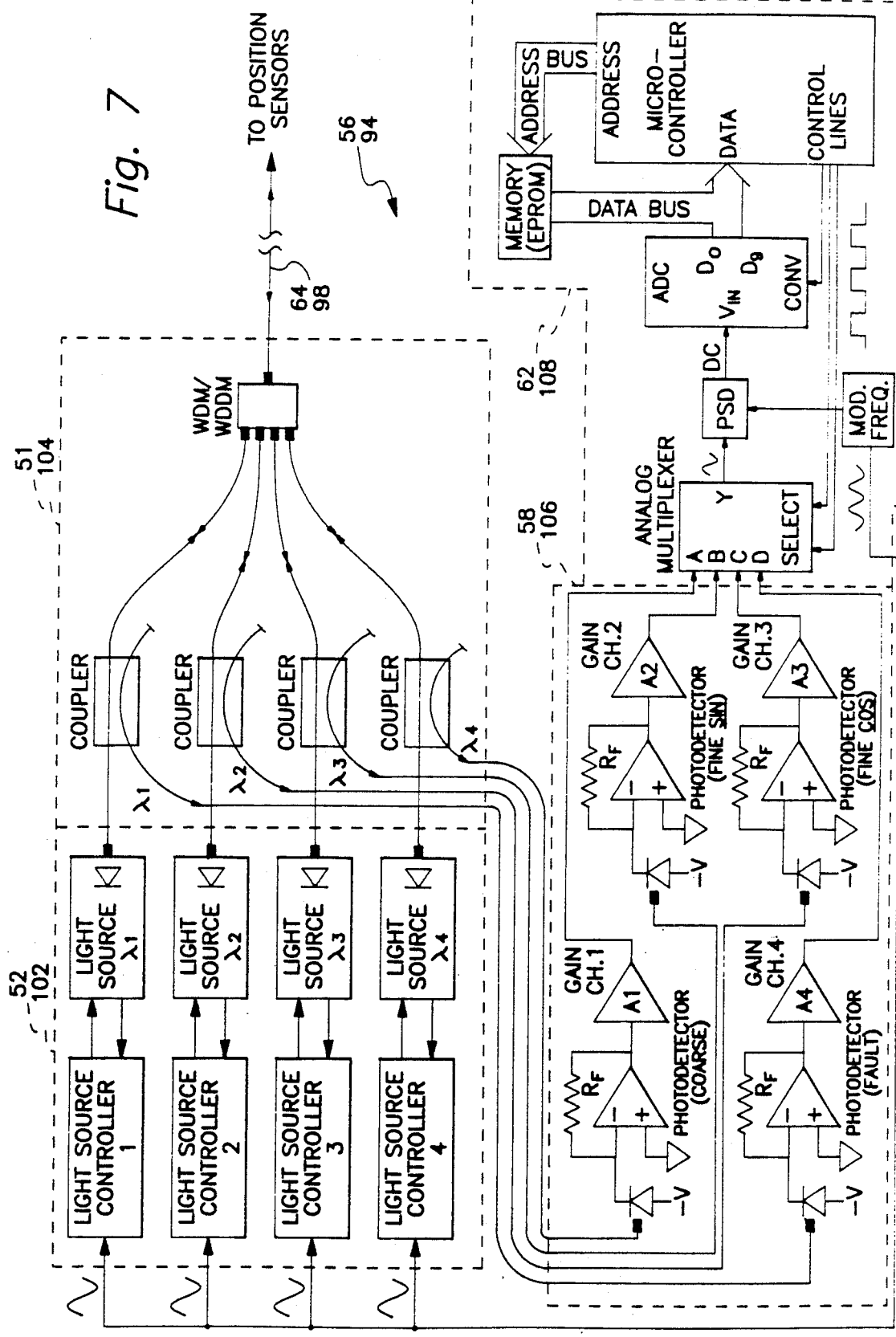
FIG. 7 is a schematic of the wavelength division multiplexing version of the transmitter and receiver electronics.

Both coarse and fine position sensing signals are multiplexed through time division or wavelength division. System 60 or 90 having wavelength multiplexing (of FIG. 7) utilizes three position sensors—coarse, sine fine and cosine fine. Also, system 60 or 90 includes fault detector 46 or 97. Each of these four sensors are driven by light source 52 or 102 having a given wavelength $lambda_n$. Each of the sensors' information is processed separately. There are four light sources, each having a different wavelength $lambda_1$, $lambda_2$, $lambda_3$ and $lambda_4$, which are driven by separate light source controllers. All four controllers of module 52 or 102 are modulated with a bias frequency $f_b$. The modulated light exiting the source passes through the source coupler to a wavelength division multiplexer/demultiplexer which is a part of coupler module 51 or 104. Each of the four sensors (three position and one fault detector) have modulated light of a specific wavelength supplied to it. The returning light intensity is a function of the position of that sensor, and is separated by the wavelength division multiplexer/demultiplexer according to different wavelengths. The individual source couplers of module 51 or 104 couple the returning light to the corresponding photodetector amplifier of module 58 or 106, each of which will be followed by the proper gain for that specific sensor. An analog multiplexer controlled by a microcontroller of electronics module 62 or 108, selects the analog inputs one at a time to the input of the phase sensitive demodulator (PSD); the output of which is a DC voltage proportional to the light intensity returning from the corresponding sensor. Digitizing the DC voltage is accomplished with the analog-to-digital converter (ADC) of module 62 or 108, which in turn provides a 10-bit binary number to the microcontroller. Using a characterization look-up table in the memory of module 62 or 108, the microcontroller translates the input 10-bit binary numbers resulting from the position of the sensors into the actual position of the position sensor.

Figure 8:
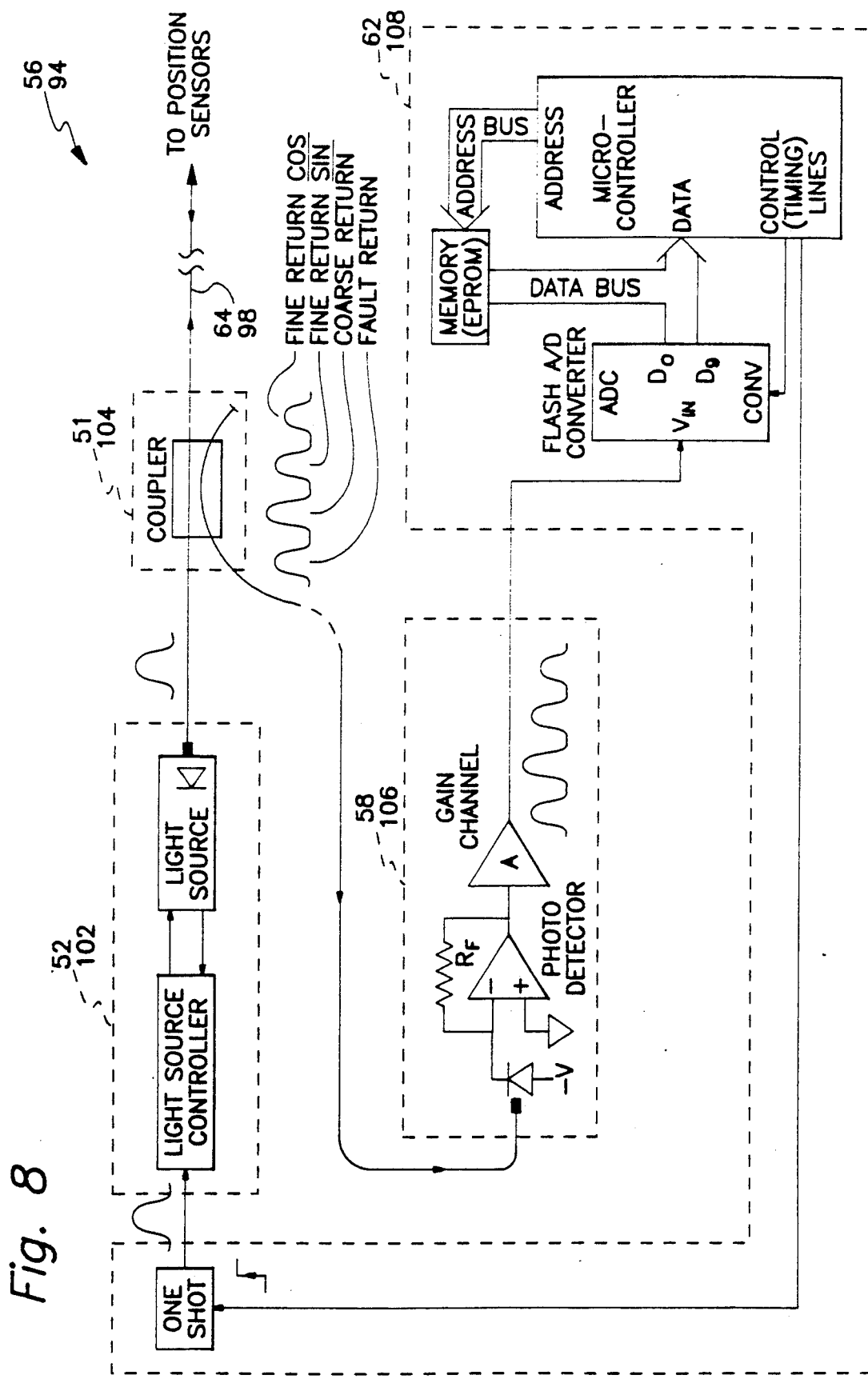
FIG. 8 is a schematic of the time division multiplexing version of the transmitter and receiver electronics.

Like wavelength division multiplexing, system 60 or 90 having time division multiplexing (of FIG. 8) utilizes three position sensors course, sine fine and cosine fine sensing plus fault detection sensor 46 or 97. Each of these four sensors are driven by the same light source of module 52 or 102, but since the fiber length to each of them is different, the returning light information is processed differently in time. The output power of the light source is monitored and controlled by a light source controller of module 52 or 102 which is driven by a circuit that produces one pulse of a specific duration (i.e., a "one-shot"). The microcontroller triggers the one-shot circuit of module 62 or 108 to produce a single pulse driving the light source controller. A single light pulse passes through source coupler 51 or 104 to arrive at the position sensors at different times. This is due to the different fiber lengths of these sensors. The returning light pulses are separated in time as they are coupled through source coupler 51 or 104 to photodetector module 58 or 106. A fixed gain amplifier of module 58 or 106 amplifies all four returning pulses equally and presents them to the input of the analog-to-digital converter (ADC) of electronics module 62 or 108. The ADC is of the flash type and can convert the magnitude of each of the four pulses at a very high speed. The 10-bit binary number at the output of the ADC is proportional to the position of each of the position sensors.

The microcontroller of module 62 or 108, using a characterization look-up table in the memory of module 62 or 108, converts the four 10-bit numbers produced by the ADC into actual positions of the position sensors.

What is claimed is:

1. An electrically passive fiber optic position sensor for measuring the position of an object, comprising:
    first detection means for detecting a coarse position of the object, via a first fiber optic light signal dependent upon a variation of at least one fiber optical parameter; and
    second detection means for detecting a periodic fine position of the object, via a second fiber optic light signal dependent on a variation of magnetic flux.

2. Apparatus of claim 1 wherein:
    the at least one fiber optical parameter is bending loss; and
    the variation of the magnetic flux is a Faraday effect.

3. An electrically passive fiber optic position sensor for measuring the position of an object, comprising:
    an optic fiber having first and second ends wherein the second end has a mirror;
    attachment means for attaching the first end of said optic fiber to the object to be measured;
    a spool having the second end of said fiber and some of said fiber wound about said spool wherein a first direction of movement of the object to be measured causes said spool to turn and an amount of said fiber on said spool to decrease thereby resulting in a decrease of bending loss of light in said optic fiber;
    a disk, connected to said spool, wherein said disk moves coincidently with said spool, and said disk has a plurality of permanent magnets situated about a perimeter of said disk;
    a first read head situated near the plurality of permanent magnets such that when said spool move then the plurality of permanent magnets moves relative to said first read head;
    a second read head situated near the plurality of permanent magnets such that when said spool moves then the plurality of permanent magnets moves relative to said second read head; and
wherein:
    light is input into the first end of said optic fiber and reflected by the second end of said optic fiber and the difference in amplitudes of the input light and the reflected light indicate a coarse position the object measured; and
    light is input to and reflected by said first and second read heads and differences in amplitude of the input light and reflected light indicate a fine position of the object measured.

4. An electrically passive fiber optic position sensor for measuring the position of an object, comprising:
    first fiber optic sensing means for determining coarse position of the object via an effect of magnetic flux upon a light signal in said first fiber optic sensing means; and
    second fiber optic sensing means for determining fine position of the object via an effect of magnetic flux upon a light signal in said second fiber optic sensing means.

5. An electrically passive fiber optic position sensor for measuring the position of an object, comprising:
    first sensing means for detecting magnetic flux and providing a light signal response indicating a magnitude of the magnetic flux;
    first magnetic means for providing a field of magnetic flux in the vicinity of said first sensing means, wherein the flux varies with movement of said first sensing means so as to be indicative of said first sensing means relative to said first magnetic means;
    second sensing means for detecting magnetic flux and providing a light signal response indicating a magnitude of the magnetic flux;
    second magnetic means for providing a field of magnetic flux in the vicinity of said second sensing means, wherein the flux varies with said second sensing means so as to be indicative of a position of said second sensing means relative to said second magnetic means;
    shaft means, connected to the object, said first sensing means and second sensing means, for supporting said first and second sensing means and providing a mechanical connection between the object and first and second sensing means; and
wherein:
    said first sensing means provides information indicating a coarse position of the object; and
    said second sensing means provides information indicating a fine position of the object.

6. Apparatus of claim 5 wherein said second sensing means comprises:
    a first fiber optic sensor for providing information about the fine position of the object in a periodic sine function type of signal effect due to Faraday effect; and
    a second fiber optic sensor for providing information about the fine position of the object in a periodic cosine function type of signal effect due to Faraday effect.

* * * * *